United States Patent
Warther

(10) Patent No.: US 8,052,061 B2
(45) Date of Patent: Nov. 8, 2011

(54) PERMANENT RFID LUGGAGE TAG WITH SECURITY FEATURES

(75) Inventor: Richard O. Warther, West Chester, PA (US)

(73) Assignee: Vanguard Identification Systems, Inc., West Chester, PA (US)

( * ) Notice: Subject to any disclaimer, the term of this patent is extended or adjusted under 35 U.S.C. 154(b) by 0 days.

(21) Appl. No.: 12/960,941

(22) Filed: Dec. 6, 2010

(65) Prior Publication Data

US 2011/0133904 A1 Jun. 9, 2011

Related U.S. Application Data

(63) Continuation-in-part of application No. 12/416,637, filed on Apr. 1, 2009, now Pat. No. 7,845,569, which is a continuation-in-part of application No. 11/735,891, filed on Apr. 16, 2007, now Pat. No. 7,909,955, which is a continuation of application No. 11/099,998, filed on Apr. 6, 2005, now Pat. No. 7,204,652, which is a continuation-in-part of application No. 10/279,752, filed on Oct. 23, 2002, now Pat. No. 6,994,262.

(60) Provisional application No. 61/041,454, filed on Apr. 1, 2008, provisional application No. 61/301,411, filed on Feb. 4, 2010, provisional application No. 60/401,789, filed on Aug. 7, 2002, provisional application No. 60/559,789, filed on Apr. 6, 2004.

(51) Int. Cl.
*G06K 19/00* (2006.01)
*G06K 19/06* (2006.01)

(52) U.S. Cl. .................. 235/492; 235/487

(58) Field of Classification Search .......... 235/435, 235/439, 451, 487, 492; 340/10, 572
See application file for complete search history.

(56) References Cited

U.S. PATENT DOCUMENTS 4,861,644 A 8/1989 Young et al.
4,978,146 A 12/1990 Warther et al.
(Continued)

FOREIGN PATENT DOCUMENTS

WO WO-2006052422 A2 5/2006
(Continued)

OTHER PUBLICATIONS

The Future of Electronic Paper. Oct. 15, 2007. 9 pages. http://thefutureofthings.com/articles/1000/the-future-of-electronic-paper.html by The Future of Things.

(Continued)

*Primary Examiner* — Michael G Lee
*Assistant Examiner* — Matthew Mikels
(74) *Attorney, Agent, or Firm* — Panitch Schwarze Belisario & Nadel LLP

(57) ABSTRACT

An integral, one-piece, resiliently flexible, planar, reusable, programmable radio frequency identification (RFID) luggage tag has a planar flexible sheet core of at least first and second microporous polymer material strips fixedly and permanently joined together completely surrounding first and second RFID transponder assemblies operating at different frequencies. The tag further includes a programmable electronic flexible sheet display in a visibly accessible position on the tag. The tag is further includes a cell phone number and/or email address of an ultimate designated recipient/user of the tag and instructions to contact the recipient via the number or address. The number and/or address are printed on the tag in a 2D bar code format and/or encoded into a programmable memory portion of at least one of the RFID assemblies to be outputted when polled.

27 Claims, 8 Drawing Sheets

U.S. PATENT DOCUMENTS

| | | |
|---|---|---|
| 5,233,167 A | 8/1993 | Markman et al. |
| 5,340,968 A | 8/1994 | Watanabe et al. |
| 5,366,249 A | 11/1994 | Diemert |
| 5,478,991 A | 12/1995 | Watanabe et al. |
| 5,495,981 A | 3/1996 | Warther |
| 5,581,257 A | 12/1996 | Greene et al. |
| 5,693,766 A | 12/1997 | Bradbury |
| 5,743,567 A | 4/1998 | Warther |
| 5,769,457 A | 6/1998 | Warther |
| 5,838,253 A | 11/1998 | Wurz et al. |
| 5,863,076 A | 1/1999 | Warther |
| 5,912,981 A | 6/1999 | Hansmire et al. |
| 5,973,600 A | 10/1999 | Mosher, Jr. |
| 5,979,941 A | 11/1999 | Mosher, Jr. et al. |
| 6,010,159 A | 1/2000 | Warther |
| 6,039,356 A | 3/2000 | Warther et al. |
| 6,050,622 A | 4/2000 | Gustafson |
| 6,089,611 A | 7/2000 | Blank |
| 6,290,138 B1 | 9/2001 | Ohno et al. |
| 6,305,716 B1 | 10/2001 | Warther et al. |
| 6,325,294 B2 | 12/2001 | Tuttle et al. |
| 6,588,658 B1 | 7/2003 | Blank |
| 6,693,544 B1 | 2/2004 | Hebbecker |
| 6,769,718 B1 | 8/2004 | Warther et al. |
| 6,942,155 B1 | 9/2005 | Stewart et al. |
| 6,994,262 B1 | 2/2006 | Warther |
| 7,153,620 B2 | 12/2006 | Aylward et al. |
| 7,193,504 B2 | 3/2007 | Carrender et al. |
| 7,204,652 B2 | 4/2007 | Warther |
| 7,225,993 B2 | 6/2007 | Warther |
| 7,236,151 B2 | 6/2007 | Doane et al. |
| 7,377,445 B1 | 5/2008 | Stewart et al. |
| 7,479,940 B2 | 1/2009 | Marhefka |
| 7,584,896 B2 | 9/2009 | Warther |
| 7,845,569 B1 | 12/2010 | Warther et al. |
| 7,909,955 B2 | 3/2011 | Warther |
| 2003/0173408 A1 | 9/2003 | Mosher et al. |
| 2004/0119593 A1 | 6/2004 | Kuhns |
| 2005/0108912 A1 | 5/2005 | Bekker |
| 2006/0032907 A1 | 2/2006 | Zercher |
| 2007/0152826 A1 | 7/2007 | August et al. |
| 2008/0030017 A1 | 2/2008 | Warther |
| 2008/0099723 A1 | 5/2008 | Nose et al. |
| 2008/0273023 A1 | 11/2008 | Nose et al. |
| 2009/0009412 A1 | 1/2009 | Warther |
| 2009/0040048 A1 | 2/2009 | Locker et al. |
| 2010/0065648 A1 | 3/2010 | Warther |

FOREIGN PATENT DOCUMENTS

| | | |
|---|---|---|
| WO | WO-2007011514 A2 | 1/2007 |

OTHER PUBLICATIONS www.ier.fr 2007© Discussion of Air Transportation and baggage handling. 8 pages.

*High Definition Printing t™ for Maximum Security Identification Cards.* Technology White Paper. 2008. HID GLOBAL1. 4 pages. www.hidglobal.com.

Alien Company home page discussing Radio Frequency Identification (RFID) products at 2009©.

WWW.ALIENTECHNOLOGY.COM home page. 2007©.

ISO/IEC; "*International Standard—ISO/IEC 7811-2—Identification Cards—Recording Technique*", Part 2, Reference No. ISO/IEC 7811-2-1995(E); 17 pages; (Second Edition Aug. 15, 1995); Geneva, Switzerland.

Itinerary is created online by customer at remote web site and assigned unique itinerary number (AA123456) in web site database

↓

Customer is prompted to check-in bags online

↓

A unique 2D barcode is displayed online which is then scanned by the customer using their cell phone. The barcode contains unique itinerary identification information (Customer may be prompted to take a picture of luggage and upload it to the website.)

↓

Customer then scans the 2-D barcode of luggage tag that will be used with the relevant trip.

↓

Data from the online displayed barcode prompts APP in phone to access host via the cellular internet connection and links the bags for John Smith with the itinerary for John Smith (AA123456)

↓

At airport arrival, bag is weighted. If tag, itinerary and ID all match-up, bag is accepted. Any connecting and the final destination airport and flight number are identified and written to tag at Check-In.

↓

Bag is sorted and loaded on plane passing through an RFID reader that captures bag information from ramp belt trucks used to convey bags into the cargo hull of the plane.

↓

Customer is sent text or voice message with time/date and location of luggage throughout its transport in and out of departing, connecting and destination cities.

Fig. 12

PERMANENT RFID LUGGAGE TAG WITH SECURITY FEATURES

CROSS-REFERENCE TO RELATED APPLICATIONS

This application is a Continuation-in-part of Ser. No. 12/416,637 filed Apr. 1, 2009 and now U.S. Pat. No. 7,845,569; which is a Continuation-in-part of U.S. application Ser. No. 11/735,891, filed on Apr. 16, 2007 which is a Continuation of U.S. application Ser. No. 11/099,998 filed Apr. 6, 2005 and now U.S. Pat. No. 7,204,652; which is a Continuation-in-part of U.S. application Ser. No. 10/279,752, filed Oct. 23, 2002 and now U.S. Pat. No. 6,994,262. This application further claims the benefit of priority of U.S. Provisional Patent Application Nos. 61/301,411 filed Feb. 4, 2010; 61/041,454 filed Apr. 1, 2008; 60/559,789 filed on Apr. 6, 2004; and 60/401,789, filed on Aug. 7, 2002. All of the above-identified applications are incorporated by reference herein in their entireties.

BACKGROUND OF THE INVENTION

The present invention relates to printed identification tags and, in particular, to reusable baggage tags.

Travelers are encouraged to tag their baggage to assist in owner identification. Many travelers use permanent tags with personal information printed or hand written. Some bags are equipped with viewing compartments configured to receive a conventional business card carrying the same information. Virtually all airlines request travelers to mark their bags. Most airlines will even provide travelers with disposable tags on which the traveler can provide personal identification and contact information if the traveler's bags do not include their own tags.

One major drawback of such tags is that they are not integrated into airline baggage handling systems, which utilize special, machine readable disposable tags applied by the airlines to each piece of baggage given over to the airline to transport.

Another major drawback is that the machine readable disposable tags applied by the airlines are not reusable. Discarded machine readable baggage tags create over a million pounds of waste per year.

It would be beneficial to provide a permanent baggage tag that could be used repeatedly by travelers and be capable of integration into a carrier baggage management system for simultaneous reuse by one or more baggage carriers.

BRIEF SUMMARY OF THE INVENTION

In one aspect, the invention is an integral, one-piece, resiliently flexible, planar, reusable, programmable radio frequency identification (RFID) luggage tag comprising: a planar flexible sheet core having major planar opposing first and second sides, the core including at least first and second core strips of flexible, microporous polymer material fixedly and permanently joined together, the microporosity being provided by pores located substantially throughout the microporous polymer material; a first non-porous, polymer film cover strip integrally and permanently secured to the first major outer side of the core, the first cover strip being coextensive with and forming a first outer side of the tag; a first RFID transponder assembly operating at a first frequency and a second RFID transponder assembly operating at a second frequency different from the first frequency permanently and integrally embedded between the first and second first core strips, partially collapsing the porosity of the core strip material enough to maintain an essentially uniform thickness with the transponder assembly embedded, at least one of the first and second transponder assemblies including non-volatile memory containing a non-alterable permanent code uniquely assigned to the transponder assembly and at least one of the first and second transponder assemblies containing a programmable memory portion with space to store information externally programmed into the portion; and a programmable electronic flexible sheet display in a visibly accessible position on the tag.

In another aspect, the invention is an integral, one-piece, resiliently flexible, planar, reusable, programmable radio frequency identification (RFID) luggage tag comprising: a planar flexible sheet core having major planar opposing first and second sides, the core including at least first and second core strips of flexible, microporous polymer material fixedly and permanently joined together, the microporosity being provided by pores located substantially throughout the microporous polymer material; a first non-porous, polymer film cover strip integrally and permanently secured to the first major outer side of the core, the first cover strip being coextensive with and forming a first outer side of the tag; a first RFID transponder assembly operating at a first frequency and a second RFID transponder assembly operating at a second frequency different from the first frequency permanently and integrally embedded between the first and second first core strips, partially collapsing the porosity of the core strip material enough to maintain an essentially uniform thickness with the transponder assembly embedded, at least one of the first and second transponder assemblies including non-volatile memory containing a non-alterable permanent code uniquely assigned to the transponder assembly and at least one of the first and second transponder assemblies containing a programmable memory portion with space to store information externally programmed into the portion; and at least one of a phone number and email address of an ultimate designated recipient permanently printed in a first variable data field of the tag in a machine readable, two dimensional bar code format.

In yet another aspect, the invention is an integral, one-piece, resiliently flexible, planar, reusable, programmable radio frequency identification (RFID) luggage tag comprising: a planar flexible sheet core having major planar opposing first and second sides, the core including at least first and second core strips of flexible, microporous polymer material fixedly and permanently joined together, the microporosity being provided by pores located substantially throughout the microporous polymer material; a first non-porous, polymer film cover strip integrally and permanently secured to the first major outer side of the core, the first cover strip being coextensive with and forming a first outer side of the tag; a first RFID transponder assembly operating at a first frequency and a second RFID transponder assembly operating at a second frequency different from the first frequency permanently and integrally embedded between the first and second first core strips, partially collapsing the porosity of the core strip material enough to maintain an essentially uniform thickness with the transponder assembly embedded, at least one of the first and second transponder assemblies including non-volatile memory containing a non-alterable permanent code uniquely assigned to the transponder assembly and at least one of the first and second transponder assemblies containing a programmable memory portion with space to store information externally programmed into the portion; and at least one of a phone number and email address of an ultimate designated recipient encoded into the programmable memory portion of the at least one of the first and second transponder assemblies so as to be transmitted by at least one of the first and second transponder assemblies upon interrogation.

BRIEF DESCRIPTION OF THE DRAWINGS

The foregoing summary, as well as the following detailed to uniquely identify that inlay chip description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

FIG. 4 illustrates the steps of typical processing of the printed planar baggage tag of FIGS. 1-3 at check-in;

FIG. 12 depicts the steps that might be followed to use the printed planar baggage tag of FIGS. 7-9.

DETAILED DESCRIPTION OF THE INVENTION

Figure 1:
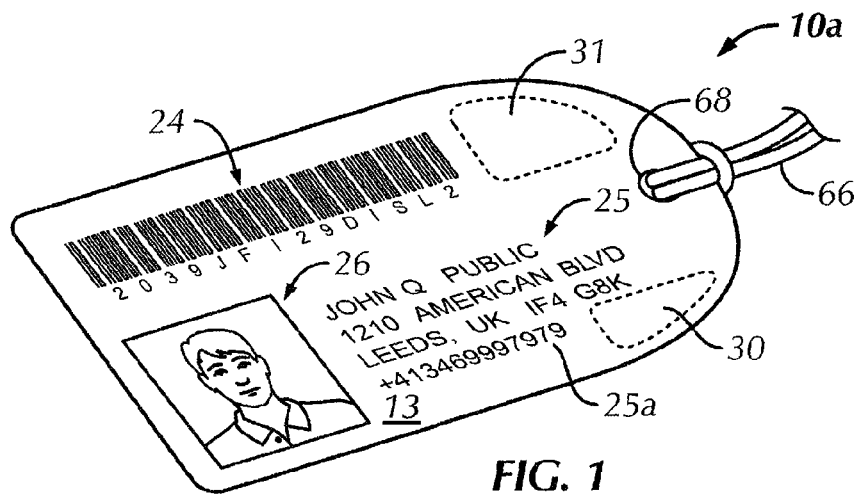
FIG. 1 is a perspective view of a "front" side of a first exemplary embodiment printed planar baggage tag according to the present invention.
Figure 2:
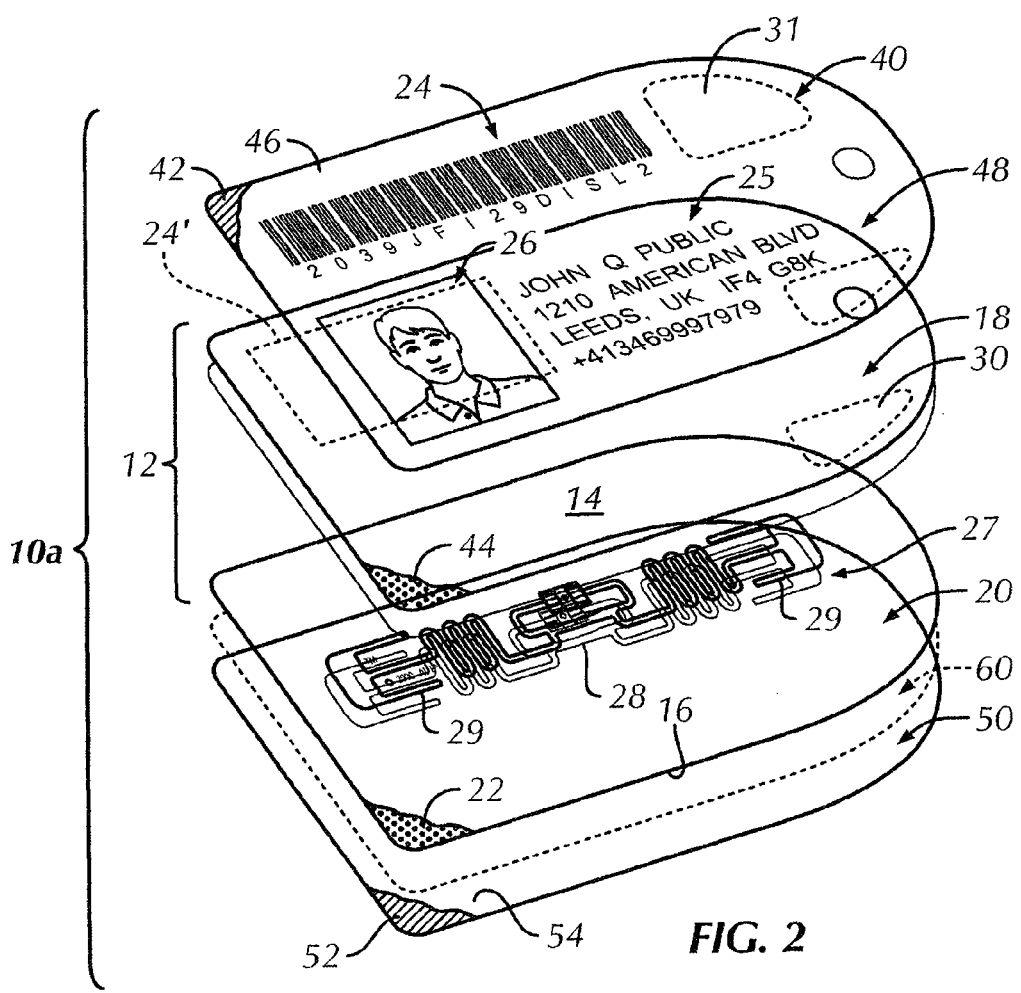
FIG. 2 is an exploded view of the printed planar baggage tag of FIG. 1.
Figure 3:
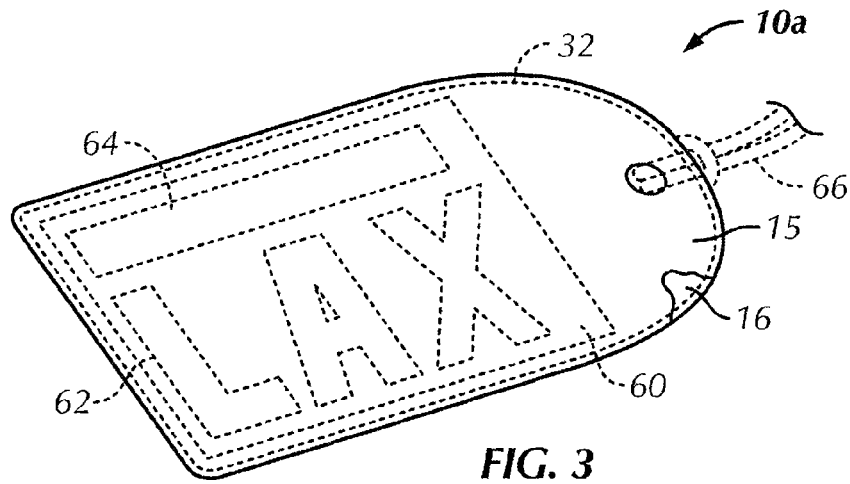
FIG. 3 is a perspective view of the "rear" side of the printed planar baggage tag of FIGS. 1 and 2.

FIGS. 1-3 depict a first exemplary embodiment, multilayer, integral, one-piece individual printed identification element in the form of a resiliently flexible, planar, reusable, programmable radio frequency identification (RFID) baggage tag according to the present invention indicated generally at 10a. Element/tag 10a has first and second opposing major planar outer sides 13 and 15 indicated and depicted in FIGS. 1 and 3, respectively.

The element/tag 10a of FIGS. 1-3 includes a planar, flexible sheet core indicated generally at 12 having major planar opposing first and second sides 14 and 16. The first or "front" major planar side 14 is depicted in FIGS. 1 and 2. A second or "rear" major planar side 16 is depicted in FIG. 3. Core 12 is preferably formed by at least first and second core strips 18, 20 fixedly and permanently joined together around a radio frequency identification (RFID) transponder assembly inlay indicated generally at 27 in FIG. 2. Each of the first and second core strips 18, 20 is integral, planar, flexible and, according to an important aspect of the invention, each is preferably of a microporous polymer material that can at least partially collapsed around the RFID transponder assembly inlay 27 as will be described. The microporosity is provided by micropores located substantially throughout the microporous polymer material. The first or "front" major planar outer side 14 is formed by an exposed major side of the first core strip 18. The second or "rear" opposing major planar side 16 of core 12 is formed by an exposed major side of the second core strip 20. If desired, an anti-counterfeiting tag agent ("taggent") can be provided to either or both core strips 18, 20. For example UV and/or IR light responsive agent(s) can be provided on either or both core sides 14, 16 as disbursed spots or microscopic images printed.

Referring back to FIG. 2, a first cover strip indicated generally at 40 is integrally and permanently secured to the core 12 over the exposed major side of the first core strip 18 forming the first or "front" major planar side 14 of the core 12. The first cover strip 40 may be secured with the core 12 by an appropriate adhesive layer 44, preferably a heat or light activated adhesive for permanence. First cover strip 40 forms and is coextensive with the first major planar outer side 13 of the tag 10a and, preferably is further coextensive with the first major side 18 of the core 12 as well. According to an important aspect of the invention, the first cover strip 40 is a non-porous polymer film layer 42 that bears or is capable of receiving and bearing a dye diffusion thermal transfer ("d2t2") image indicated generally at 48 printed directly on a polymer film layer 42 such as polyvinyl chloride (PVC) or, alternatively, in a coating 46 on the outward facing surface of the polymer layer 42. Such a latter sheet product is supplied by Transilwrap Company Inc. of Franklin Park, Ill., under the name "Trans-Kote® SCF Laminating Film", which has a proprietary coating on a polyester (PE) film stock.

In the depicted embodiment 10a, a second cover strip 50 is preferably provided, also integrally secured to the second core strip 20 forming the second, "rear" major planar side 16 of the core 12 at least for protection of the core. Second cover strip 50 suggestedly is again a non-porous polymer film layer 52 permanently and integrally secured to the second side 16 of the core 12 by an appropriate adhesive layer 54, preferably a heat or light activated adhesive for permanence. Second cover strip 50 is also coextensive with and forms the second outer side 15 of the tag 10a and is also preferably coextensive with the second side 16 of the core 12 as well. The second cover strip 50 may be PE or polyester base or may be another polymer like PVC, polycarbonate (PC), polyphenyl deltabutylene (PdB), or other vinyl/polyester composites.

According to the invention, at least one or more typically a plurality of variable data fields are printed and visible on one or both major sides 13, 15 of the tag 10a. Referring back to FIG. 1, the first major side 13 of the tag 10a is shown printed permanently in ink(s) with a plurality of spaced-apart, variable data fields, three variable data fields being identified at 24, 25 and 26. First variable data field 24 is printed in permanently ink(s) with a unique code namely, "2039JFI29DISL2" in the indicated example. The unique code is printed in machine readable format like a bar code, may be printed in human and optical readable character format or preferably, as indicated in tag 10a, in both formats so that all printed unique codes are capable of being visually as well as machine read. Preferably, at least one unique tag identification code printed in ink in one of the variable data fields is or includes a unique identifier assigned to the RFID chip 28 or transponder assembly 27 during its manufacture. This can be used as the unique tag identification code 24 or as at least part of that code of the tag as well as a way to identify the RFID chip/assembly should the tag malfunction. Variable data field 25 is printed for example with a unique name and address combination of an individual assigned the tag 10a. Variable data field 26 is printed with an image of the individual named in variable data field 25. The information in each variable field 25 and 26 should uniquely identify the one individual to whom the tag 10a is assigned. Other unique codes can be printed in these or other variable data fields, if provided. For example, the text in variable data field 25 might include a telephone or passport or driver's license number 25a, if desired. All would also be unique. The unique identification code can be printed on the outside of the tag, for example on the first cover layer 40 as indicated in solid in FIG. 2, or on the core 12 during tag manufacture as indicated diagrammatically by phantom block 24'.

In addition to the variable data fields 24-26, the tag 10a typically includes one or more printed static graphic fields, three separate static graphic fields 30, 31, 32 being indicated in block diagram form, in phantom in FIGS. 1-3. Static graphic fields generally may be a graphic image or text or a combination, which is typically repeated identically on each other individual printed sheet product/luggage tag of a collection or set of like product/baggage tags. Decorative static graphics need not be identical on each individual sheet product 10a but would typically be provided in a single pattern that might span several adjoining individual tags when the tags were being manufactured. However, static graphic fields are distinguished from variable data fields in that static graphic fields carry no data unique to the tag. It will be appreciated that static graphic field(s), in particular, can be printed on either or both major planar sides 14, 16 of the core 12 (e.g. field 30 on side 14) and/or on either cover strip, field 31 on cover strip 40 and/or field 32 on cover strip 50 (see FIG. 3). Preferably, to the extent feasible, static graphic fields are suggestedly printed on the outer sides 14, 16 of the core 12, the porous sheet material(s) forming the core being highly receptive to various forms of digitally controlled printing and the printing being protected by the cover strips 40, 50, if transparent.

Details of preferred methods of manufacture and materials, including preferred microporous polysilicate materials for tags like luggage tags 10a (other than the provision of dye diffusion thermal transfer (d2t2) images) are disclosed in U.S. Pat. No. 7,204,652 issued Apr. 17, 2007 and application Ser. No. 11/735,891, filed Apr. 16, 2007, both incorporated by reference herein in their entireties. As described, tags are typically manufactured in bulk in sets, either in individual sheets of multiple tags or continuous webs. Individual tags in such sheets or webs are conveniently formed by mechanical scoring in such a way that they are retained in the sheets or web with other scored tags of the set. As indicated in those references, tags can be provided in multiple sets and/or with other identification elements such as cards and/or labels as individual sheet products and such individual sheet products themselves scored from individual sheets and continuous webs. Preferably the same unique code is printed in machine and human readable format on each individual identification element in the sheet product and may be printed elsewhere of the individual sheet product as well. Finally, the scoring used to form the individual tag 10a and/or individual sheet product also preferably provides the 10a with a closed perimeter opening 68 located entirely within and extending transversely entirely through the tag 10a to receive a strap 66 for attachment to luggage.

As noted earlier, tag 10a includes an RFID transponder assembly inlay 27 configured to transmit an electro/magnetic signal containing at least a unique, electro/magnetic code and other, travel related information in response to an externally transmitted, radio frequency ("RF") interrogation signal. As indicated in FIG. 2, such assemblies 27 include an antenna or antennas 29 and a small chip 28 containing the remainder of the circuitry operably connected to the antenna(s) 29. Preferably the RFID transponder assembly operates at Ultra High frequency (UHF) or higher to provide extended range compared to high frequency assemblies also in use.

The chip 28 may be active or passive. For cost consideration, a passive system is preferred. Chip 28 includes additional components such as receiving/decoding circuitry, typically a transceiver operably coupled with a decoder and the antenna 29, and power circuitry coupled between the decoding circuitry and transmitting circuitry, including a transponder coupled with the transceiver. The power circuitry being configured to temporarily store or direct energy from a received radio interrogation signal and use that energy to transmit a radio signal response with information. The circuitry of the chip 28 further includes one or more electro/magnetic data storage elements of non-volatile memory, at least a portion of which is encoded with a unique electro/magnetic identification code that is assigned to and preferably loaded into the RFID chip 28 during manufacture such that it cannot thereafter be altered. Preferably it is the same unique code that is printed in the first variable data field 24 on the first outer side 13 of the tag 10a. The selected chip 28 of the transponder assembly 27 also preferably includes programmable and other non-programmable non-volatile memories or memory regions for additional information, including travel related information. Such ravel information can include a destination airline and flight number(s), reservation numbers(s), etc.

Such RFID chips 28 and entire assemblies 27 are available from a variety of suppliers. An RFID chip 28 that is currently preferred for this use is an Alien Technologies HIGG™-3 EPC Class 1 Gen 2 RFID Tag IC. This chip is operable in the UHF spectrum (860-960 MHz) and is manufactured with at least 800 bits of non-volatile memory including 96 bits for device configuration identification and 64 bits dedicated to a non-alterable, serial TID unique to the chip. It also contains 96-EPC bits (extensible to 480 bits), 32 bits allocated for password access, 32 bits for password kill use and 512 bits available for external programming to contain other user/individual information such as individualized itinerary, flight and/or destination information. The latter may be perma-locked as well as read password protected in 64 bit blocks. The chip works with standard EPC Gen2 Readers.

The tags 10a described above require electronic reading to access the information stored in the RFID chip 28. The unique code 24 can be scanned or visually read. A modification to this basic design would be to replace the conventional second cover sheet 50 with or to position between the second cover sheet 50 and the core 12, a programmable, electronic flexible sheet display 60 like a sheet of electronic paper or "E-paper". A currently preferred technology from Fujitsu Ltd. uses cholesteric liquid crystals (ChLC) in a flexible thin film display. Such displays can be externally "programmed" to exhibit conventional luggage tag coded information, most importantly destination information 62 (in phantom), as well as other coded information 64 (in phantom) for example a carrier's baggage system code number, so that at least the destination can be visually read by baggage handlers in a conventional fashion without resort to electrical reading equipment needed to access the information on the RFID chip 28 or if the chip should fail. Fujitsu ChLC displays have the advantage of requiring no power to maintain a flicker free image. It will be appreciated that each data field 62, 64 created on the programmable electronic flexible sheet display 60 is also a variable data field of the tag 10a, although an electronically programmable as opposed to permanent printed variable data field like 22-24.

Figure 5:
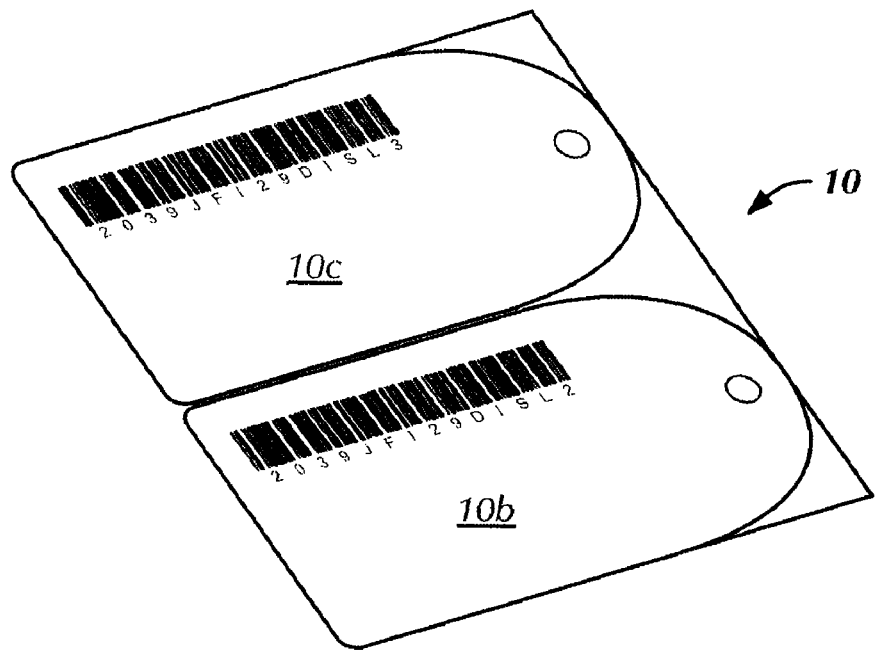
FIG. 5 depicts a pair of luggage tags scored into a larger, rectangular, individual printed sheet product 10.

Physically, although the depicted tag 10a is relatively bullet shaped, it can be rectangular or of virtually any other shape. Preferably, tag 10a is based on an industry standard card size, suggestedly CR-80, CR-90 or CR-100, for example, so that it can be printed on with a standard dye diffusion thermal transfer (d2t2) card printer, which are typically configured to handle one or more of those standard sizes. A variety of Fargo brand card Printers of the Clary Business Machines Company of San Diego, Calif. are configured to print, for example, on CR-80, -90, -100 size card blanks. The standard CR 80 card is rectangular, approximately 3 and ⅜ by 2 and ⅛ inches in size (85 mm by 54 mm). The Standard CR-90 card size is 3 and ⅝ by 2 and ⅜ inches (92 mm×60 mm), while standard CR-100 size is 3 and ⅝ by 2 and ⅝ inches (98.5 mm×67 mm). Thus, cards printed in any of the CR-80, -90, or -100 formats are nominally less than four inches (100 mm) in length and three and three-quarter inches (70 mm) in width. Alternatively, individual printed luggage tag sheet products can be provided in standard sizes and shapes for use with conventional photo image dye diffusion thermal transfer (d2t2) printers. FIG. 5, for example, depicts a pair of 3"×4" luggage tags 10b, 10c scored into a larger, rectangular, individual printed sheet product 10 that is 4"×6" in size for use with a conventional 4"×6" conventional photo image dye diffusion thermal transfer photo printer. (Other standard stock sizes, e.g. 4"×7", may be handled by different d2t2 photo printers of other manufacturers in an attempt by those manufacturers to capture print stock sales.)

The baggage tag(s) 10a, etc. can be issued to a user in real time, for example at a carrier's baggage check-in or at an independent airport kiosk, or, more preferably, can be issued with the dye diffusion thermal transfer (d2t2) printed variable data field information and delivered to the user prior to use. The exemplary tags 10a offer both options since they are standard sized (e.g. CR 80, 90 or 100 or 4"×6" or 7") and constructed to be printed on with standard dye diffusion thermal transfer (d2t2) printers. So, for example, a tag manufacturer can provide luggage tag blanks in partially printed sheet product form such as individual card banks pre scored in a standard CR or photo size bearing static graphic field(s) on one side (e.g. 32 on 16) or both sides, and preferably a permanently printed unique code to a tag issuer such as an airline. The airline can then reissue the tags themselves at airports directly to travelers or, preferably, to individuals making flight reservations before those individuals travel. The airlines can further distribute such partially preprinted tags or have them distributed to third party distributors such as travel agencies, airport kiosk services and/or other travel-related companies like, hotels, motels, rental car companies, etc., or other businesses, for their completion of the printing and distribution to ultimate travelers.

If issued by an airline or travel agency in response to a reservation, the chip 28 and/or programmable electronic flexible sheet display 60, if provided, of the tag 10a can be preprogrammed with desired information such as travel destination or itinerary information, ticket number(s), confirmation code(s), SSAN, driver's license or passport number(s) or with a single code number providing an address to such information in a separate information data bank, for example, one maintained by the airline on which the baggage is being transported (e.g. reservation system, baggage management system, etc.). The code number can be the unique code 24 assigned to the tag 10a and preferably locked into the chip 28 or assembly 27 at manufacture. A previously issued tag 10a or new tag 10a issued without the desired travel related information may be reprogrammed at airport baggage check-in using a relatively low cost, barcode/RFID scanner/antenna device. If a programmable, electronic flexible sheet display 60 is provided, it too can be activated by the end supplier and/or by the airline when the baggage is checked-in.

Figure 6:
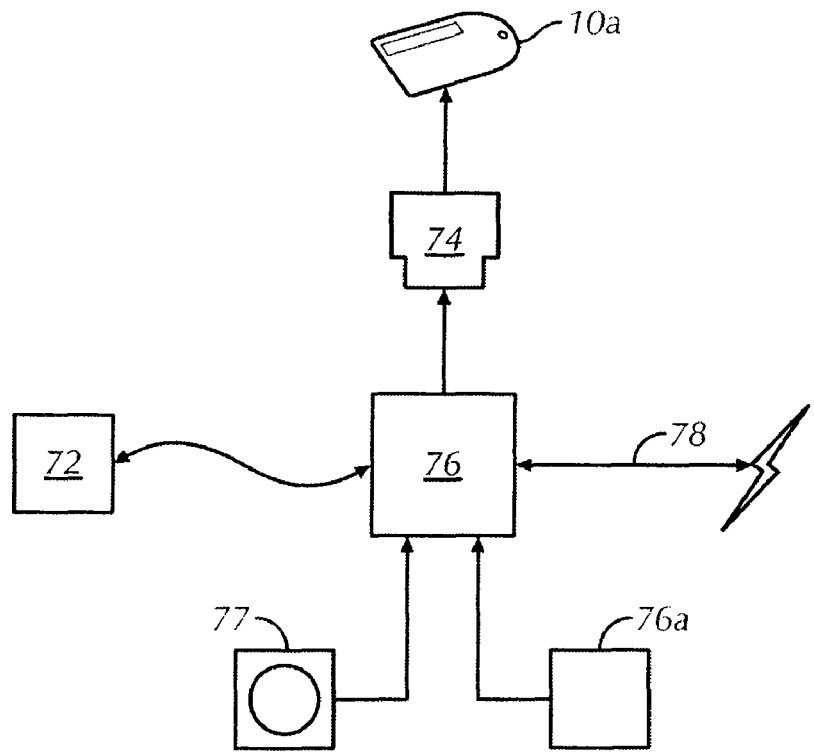
FIG. 6 depicts equipment a tag end distributor would need to prepare luggage tags of the present invention.

Referring to FIG. 6, a tag end distributer would only need an RFID reader/writer 72 and a d2t2 conventional printer 74 connected with a PC or laptop computer or dedicated processor 76 with keyboard or like data entry device 76a and an internet connection 78, e.g. USB port. Personal data can be entered from the keyboard or downloaded from the internet. Digital images 26 can be downloaded from the internet or from an inexpensive digital camera 77 connected with the processor 76. Another alternative for a traveler already in possession of a tag would be to go online to an appropriate website, such as the airline or other carrier being used, and write the travel related information to the tag 10a. A small, inexpensive, RFID reader/writer can be connected to a computer's USB port and directed by software (from the airline/other carrier or independently provided) to write flight information and/or other travel related/itinerary information to RFID memory of the tag 10a. The same web page that is acquired for printing out the user's boarding pass can be directed to write to the memory of the tag's RFID assembly information, such as flight no., reservation no., baggage system management no. and/or Baggage System Message (BSM), etc.

Figure 4:
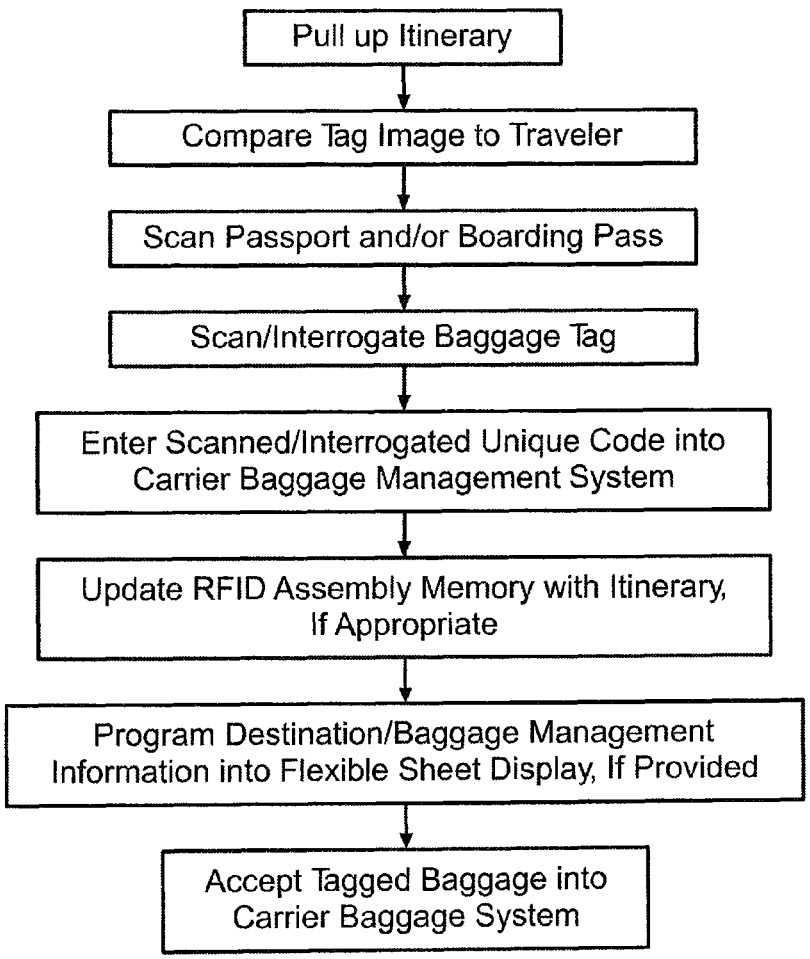

Preferably, during check-in, the RFID assembly is interrogated with a radio frequency signal appropriate to trigger a response from the RFID assembly and information provided by the RFID assembly in response to the interrogating radio frequency signal stored in a carrier's computer system (e.g. reservation and/or baggage management system and/or passenger management system). Other steps that are or may be taken at check-in including the addition of travel related information to the memory of the RFID assembly 27 and/or electronic display are indicated in FIG. 4.

Once the information is entered into the airline or other carrier's baggage management system, the tagged baggage can be located and identified anywhere as it travels throughout the carrier's baggage handling system where its location can be identified, from a distance and on the fly, wherever RFID interrogators are located, for example at each baggage conveyor switch, to assure proper routing and continuous monitoring of the baggage. By providing both machine readable coding 24 and RFID tagging, baggage can be read anywhere in the system with either type of tracking technology. By adding a programmable electronic flexible sheet display 60, the destination and other uncoded information that might also be provided can be read and used by human baggage handlers.

Specific manufacturing details and materials, including suggested materials and manufacturing techniques, as well as other configurations of printed sheet products including removable planar, printed identification elements have been disclosed in prior U.S. Pat. No. 7,204,652 attached hereto incorporated by reference herein in its entirety. At least one and preferably both core strips 18, 20 consists essentially of a porous, specifically microvoided, polymer sheet material such as Teslin, a registered trademark ("®") of PPG Industries, Pittsburgh, Pa., or Artisyn, a ® of Daramic, Inc., Charleston, S.C. Both are both microvoided, polysilicate sheet materials for laser printing. Teslin is described in detail in U.S. Pat. No. 4,861,644 incorporated by reference herein. Teslin is relatively very porous with a porosity of typically forty-five to sixty percent and an average pore size of about one micron or less. The first and second cover strips 40, 50 are suggestedly polyester, which provides good strength, wear and soil resistance properties to the outer surface of the tag 10a. However, other non-porous polymer sheet materials such as PVC or PC may be preferred for other reasons.

Microporous polysilicate sheet provides several distinct advantages. It is waterproof and durable. It also provides faster static decay times and has lower surface resistivity than PVC, PET and PC and can improve RF propagation by up to 2 to 3 db.

The preferred, microporous polysilicate material of core sheets 18, 20 wrap and protect the inlay 27 better than any known non-porous polymer material (or paper). It further provides enhanced electrical performance properties including a 2-3 db increase in RF signal propagation read range, approximately doubling the range of an RFID transponder assembly embedded in conventional, non-porous polymer (e.g. PC, PVC or PET) materials. It also provides faster static decay times and has lower surface resistivity than PVC, PET and PC providing superior static dissipative qualities compared with PVC and/or PE core materials typically used in RFID tags. It is also considerably more durable than PVC and/or PE tags, withstanding flexing and high mechanical pressure and without cracking, pealing or delaminating over wide operating and mechanical stress ranges, increasing the useful life of the tag several fold over PVC or PE core material tags. It further tears and fragments relatively easily making disassembly of the tag for alteration without damage to the core impossible. On the other hand, such microporous polymer materials are poor candidates for direct dye diffusion thermal transfer due to the tendency of the dyes to migrate into the pores. Accordingly, the dye diffusion thermal transfer images provided on the tag must be printed on a layer of non-porous polymer material or special coating over a surface of the microporous polymer material.

While a programmable electronic flexible sheet display 60 is preferred, it will be appreciated that the second side of the tag could be provided with a non-porous surface that can accept hand written wax letters or a pocket provided to receive a printed airport/baggage number tag or receipt.

Figure 7:
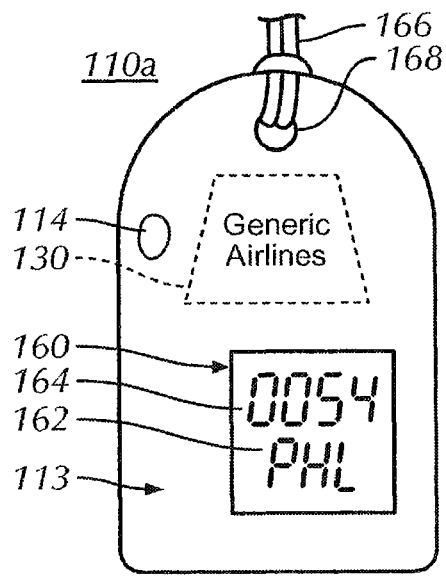
FIGS. 7 and 8 are views of first and second opposing major planar sides, respectively, of a second exemplary embodiment printed planar baggage tag according to the present invention.
Figure 8:
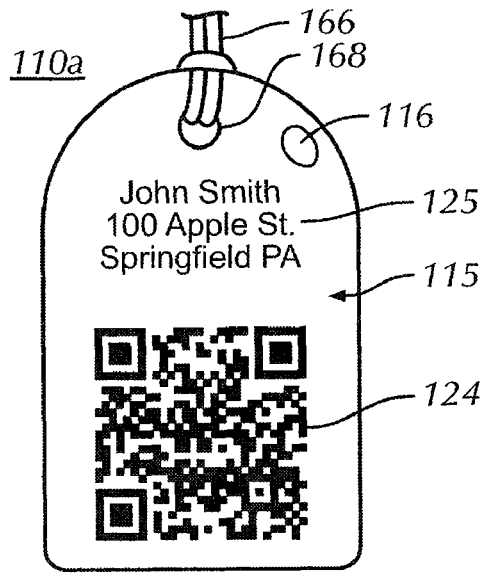
Figure 9:
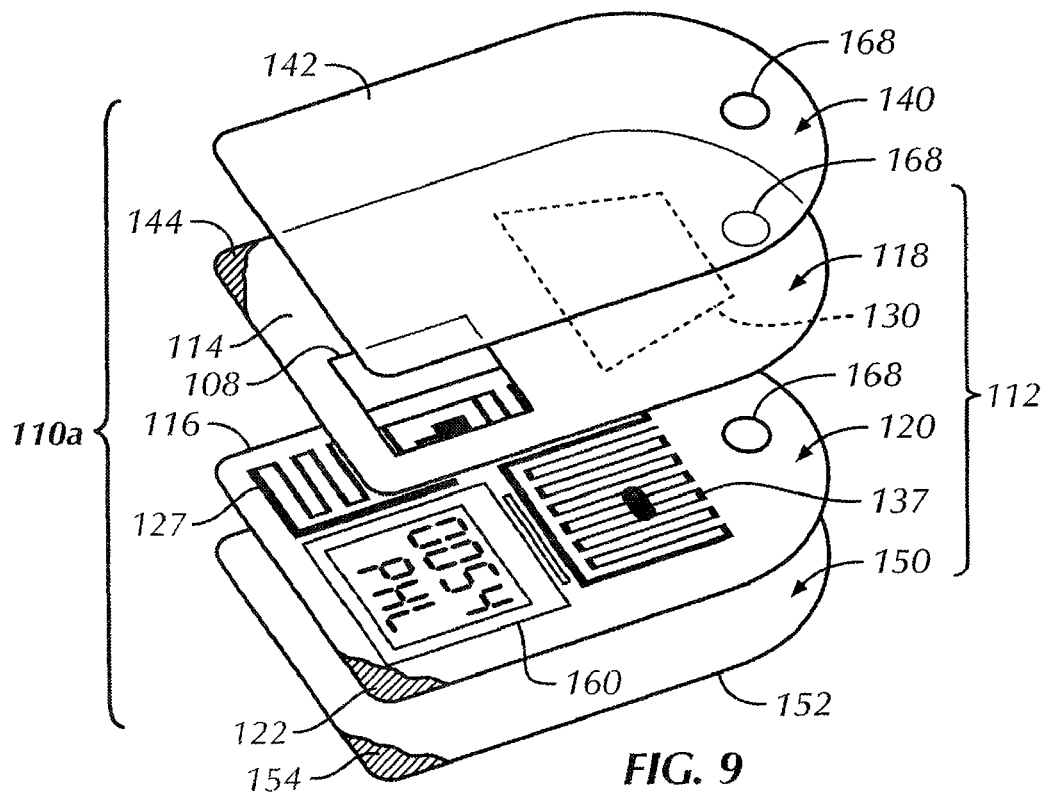
FIG. 9 is an exploded view of the printed planar baggage tag of FIGS. 7 and 8.

FIGS. 7-9 depict "front", "rear" and exploded views, respectively, of a second exemplary embodiment, resiliently flexible, planar, reusable, programmable radio frequency identification (RFID) baggage tag according to the present invention indicated generally at 110a. Element/tag 110a has first and second opposing major planar outer sides 113 and 115 indicated and depicted in FIGS. 7 and 8, respectively.

The element/tag 110a of FIGS. 7-9 includes a planar, flexible sheet core indicated generally at 112 having outer major planar opposing first and second sides 114 and 116. The first or "front" major planar side 114 is depicted in FIGS. 7 and 9. The second or "rear" major planar side 116 is depicted in FIG. 8. Core 112 is preferably formed by at least first and second core strips 118, 120 fixedly and permanently joined together around at least one and preferably a pair of radio frequency identification (RFID) transponder assemblies indicated generally at 127 and 137 in FIG. 9. Preferably, one assembly 127 operates at High Frequency (HF) and the other assembly 137 operates at Ultra High Frequency (UHF). High frequency (HF) RFID transponder assemblies/inlays are relatively short ranged (i.e. inches) while ultra high frequency RFID transponder assemblies have a longer range (e.g. tens of feet) for longer range applications such as object locating. Each type of assembly/inlay is now available with extended memory programmable by radio. Each of the first and second core strips 118, 120 is again integral, planar, flexible and, according to an important aspect of the invention, each is preferably of a microporous polymer material that can at least partially collapsed around each RFID transponder assembly 127, 137 as was previously described.

The first or "front" major planar outer side 114 of core 112 is formed by an exposed major side of the first core strip 118. The second or "rear" opposing major planar side 116 of core 112 is formed by an exposed major side of the second core strip 120. If desired, an anti-counterfeiting tag agent ("taggent") can be provided to either or both core strips 118, 120. For example UV and/or IR light responsive agent(s) can be provided on either or both core sides 114, 116 as disbursed spots or microscopic images printed.

As with the first embodiment tag 10a, a first cover strip indicated generally at 140 is integrally and permanently secured to the core 112 over the exposed major side of the first core strip 118 and forms and is coextensive with the first major planar outer side 113 of the tag 110a and the first major side 118 of the core 112 as well. The first cover strip 140 is preferably a non-porous polymer film layer 142 permanently and integrally secured to the first side 114 of the core 112 by an appropriate adhesive layer 144 (partially depicted in FIG. 9 on first core strip 118), preferably by a heat or light activated adhesive for permanence. The first cover strip 140 may bear or at least be capable of receiving and bearing a dye diffusion thermal transfer ("d2t2") image (see 26 in FIGS. 1-2) printed directly on a polymer film layer 142 such as polyvinyl chloride (PVC) in a coating (like coating 46 of FIG. 2) on the outward facing surface of the polymer layer 142.

In the depicted embodiment 110a, a second cover strip 150 is preferably provided, also integrally secured to the second core strip 120 forming the second, "rear" major planar side 116 of the core 112 at least for protection of the core. Second cover strip 150 suggestedly is again a non-porous polymer film layer 152 permanently and integrally secured to the second side 116 of the core 112 by an appropriate adhesive layer 154 (partially depicted). Second cover strip 150 is also preferably coextensive with and forms the second outer side 115 of the tag 110a and is also preferably coextensive with the second side 116 of the core 112 as well.

Preferably, a programmable electronic flexible sheet display 160, again a sheet of electronic paper or "E-paper", is provided as part of the tag 110a. In the depicted embodiment, the programmable electronic flexible sheet display 160 including its supporting circuitry is integrally secured with the core 112 preferably between the first and second core strips 118, 120 with the RFID assemblies 127, 137, where it may be better protected. There it may be operably connected with one or both of the RFID assemblies 127, 137, if desired. Alternatively, it may be secured to one of the outer sides 114, 116 of the core 112 forming the first 140 or second cover strip 150 of the tag 110a or, more preferably, secured between one of the outer sides 114, 116 of the core 112 and one of the conventional, non-porous and transparent polymer sheet cover strips 140, 150. Again, programmable electronic flexible sheet display 160 can be externally "programmed" by radio frequency signals to exhibit conventional luggage tag coded information, most importantly destination information 162, as well as other coded information 164 such as a flight number.

According to the invention, at least one and, more typically, a plurality of variable data fields are machine printed and visible on one or both major sides 113, 115 of the tag 110a. Referring back to FIG. 8, the second major side 115 of the tag 110a is shown machine printed permanently in ink(s) with a plurality of spaced-apart variable data fields, first and second variable data fields being identified at 124 and 125, respectively. First variable data field 124 is permanently printed with information at least including a unique code, preferably in a machine readable format and, more preferably, in a machine readable, 2D or two-dimensional bar code or "matrix code" format or symbology. Variable data field 125 is printed with information, for example, text information in visually readable, alpha-numeric characters (preferably in a font that is also machine readable by optical scanning) with a unique name and address combination of an individual, the ultimate designated user who is assigned the tag 110*a*, or with a photo image of that ultimate designated user. The information in at least one and, more preferably, each variable field 124 and 125, should uniquely identify or apply to the ultimate designated user to whom the tag 110*a* is assigned.

Preferably, variable data field 124 is printed in a machine readable (optically imaged), two-dimensional bar or matrix code format, more preferably QR Code® of Denso Wave Incorporated. In contrast to single dimension bar codes (like variable data field 24) that conventionally have capacities of only about twenty digits, optically imaged, two-dimensional bar or matrix codes can store significantly greater amounts of data. QR Code® offers the largest data capacity of commonly used two-dimensional bar or matrix codes. It is capable of storing nearly five thousand mixed alpha-numeric characters and over seven thousand numeric only characters. QR Code® has a particular advantage of being freely licensed for use and its reader being a common application ("APP") in many modern, camera equipped cell phones. For example, QR Code® is the most popular two-dimensional code used in Japan and most current Japanese cell phones are equipped with APPs to read and use the data embedded in these codes using the phone's camera. By taking a photo image of a two-dimensional QR Code® variable data field 124, a suitably APP equipped cell phone can decipher and use the information embedded in the code. Moreover, QR Code® variable data fields can include embedded commands such as the information necessary for automatic connection of the cell phone to a particular web sites or phone number and further, to transmit data from the cell phone, including data embedded in the QR Code® image, to the web site, phone number or other off-site data processing function.

Preferably, at least one unique tag identification code is machine printed in variable data field 124. More preferably, that unique tag identification code is or includes at least a unique identifier assigned to at least one of the transponder assemblies 127, 137 (directly or to their circuit chips) during their manufacture. This can be used as a way to identify uniquely identify the tag and the RFID chip(s)/assembly (-ies) should the tag malfunction. Also according to the invention, the printed variable data field 124 is further encoded with other unique codes in the form of the user's name and address and further with a cell (or other) phone number for voice or text (i.e. Short Message Service or SMS) communication with the cell phone or an email address for forwarding "tweets" or other text messages via email to the user, or both. Preferably the printed variable data field 124 further includes embedded commands for at least geo tagging and automatic text or voice communication with the user via the cell phone or the internet.

Information including other unique codes can be printed in these or other variable data fields, if desired. For example, the information in variable data field 124 might include a phone or passport or driver's license number, if desired. All would also be unique to the ultimate designated recipient of the tag. The unique identification code can also be printed on the outside of the tag 110*a*, for example on the second cover sheet 150, as the bar code and visually readable name and address information were printed via d2t2 on the first cover sheet of the first embodiment tag 10*a* in FIG. 2, or conventionally laser printed on the core 112 during tag manufacture (not depicted).

Again, in addition to the variable data fields 124-125, the tag 110*a* typically includes one or more printed static graphic fields, one static graphic fields 130 being indicated in block diagram form in phantom in FIGS. 7 and 9. As with the first embodiment, preferably and to the extent feasible, static graphic fields are suggestively printed on the outer sides 114, 116 of the core 112, the porous sheet material(s) forming the core being highly receptive to various forms of digitally controlled printing and the printing being protected by transparent cover strip(s) 140, 150, if provided. Note, the programmable electronic flexible sheet display 160 also constitutes a variable data field.

Figure 10:
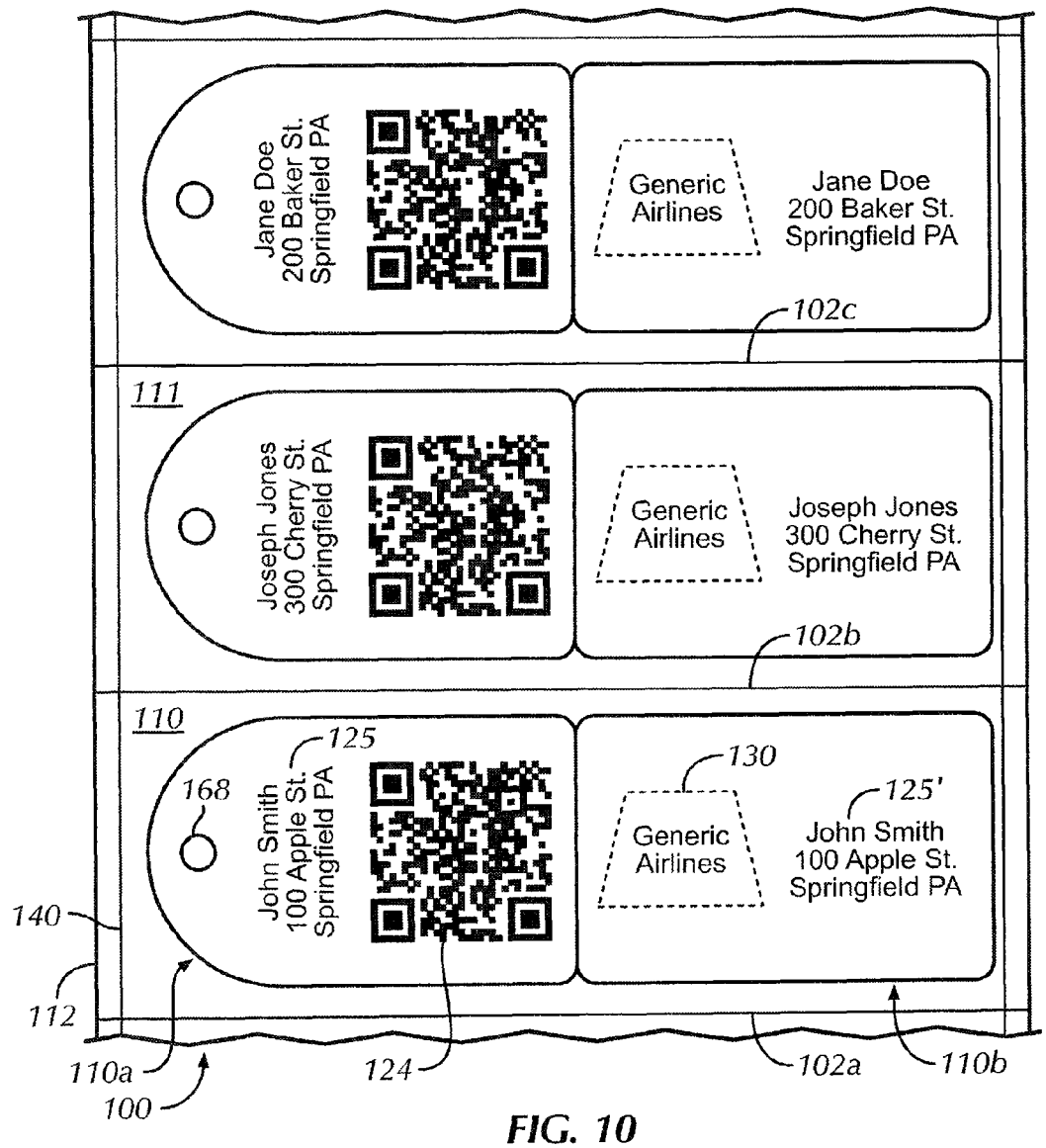
FIG. 10 depicts a larger, planar printed sheet product including the luggage tag of FIGS. 7-9.

Referring to FIG. 10, luggage tag 110*a* may be provided as part of a larger, planar printed sheet product indicated at 110. Luggage tag 110*a* is scored in the larger sheet product 110 to permit removal of the tag(s) removal from the larger sheet product 110 and is provided with a scored closed perimeter internal through opening 168 to receive some type of strap or other lanyard 166 to permit attachment of the tag 110*a* to a bag. The larger sheet product 110 is itself scored and separated from other larger sheet products 111, etc. by score lines 102*a*, 102*b*, 102*c*, etc. that are being made for other ultimate designated recipients/users and that are suggestively manufactured together with larger sheet product 110 in an even larger, batch product 100, which constitutes at least a part of a collection of the larger sheet products 110, 111, etc. having the same construction and format. As depicted, tag 110*a* includes in printed variable data field 125, the name and address of the ultimate designated recipient/user who is assigned the tag 110*a* and the name and address may be used with a window in a mailing envelope to permit mailing of the sheet product 110 to the ultimate designated recipient/user. Alternatively, the larger sheet product 110 may include a second, scored luggage tag (not depicted) or a scored identification card 110*b* with the intended user's name and address 125' and/or the name and address may simply be provided on a residual piece of the core 112 located so as to be visible in a mailing envelope window. The first and/or second cover sheets 140, 150, if either is provided, may be provided as shown extending over only the tag(s) and identification card, if provided.

Figure 11:
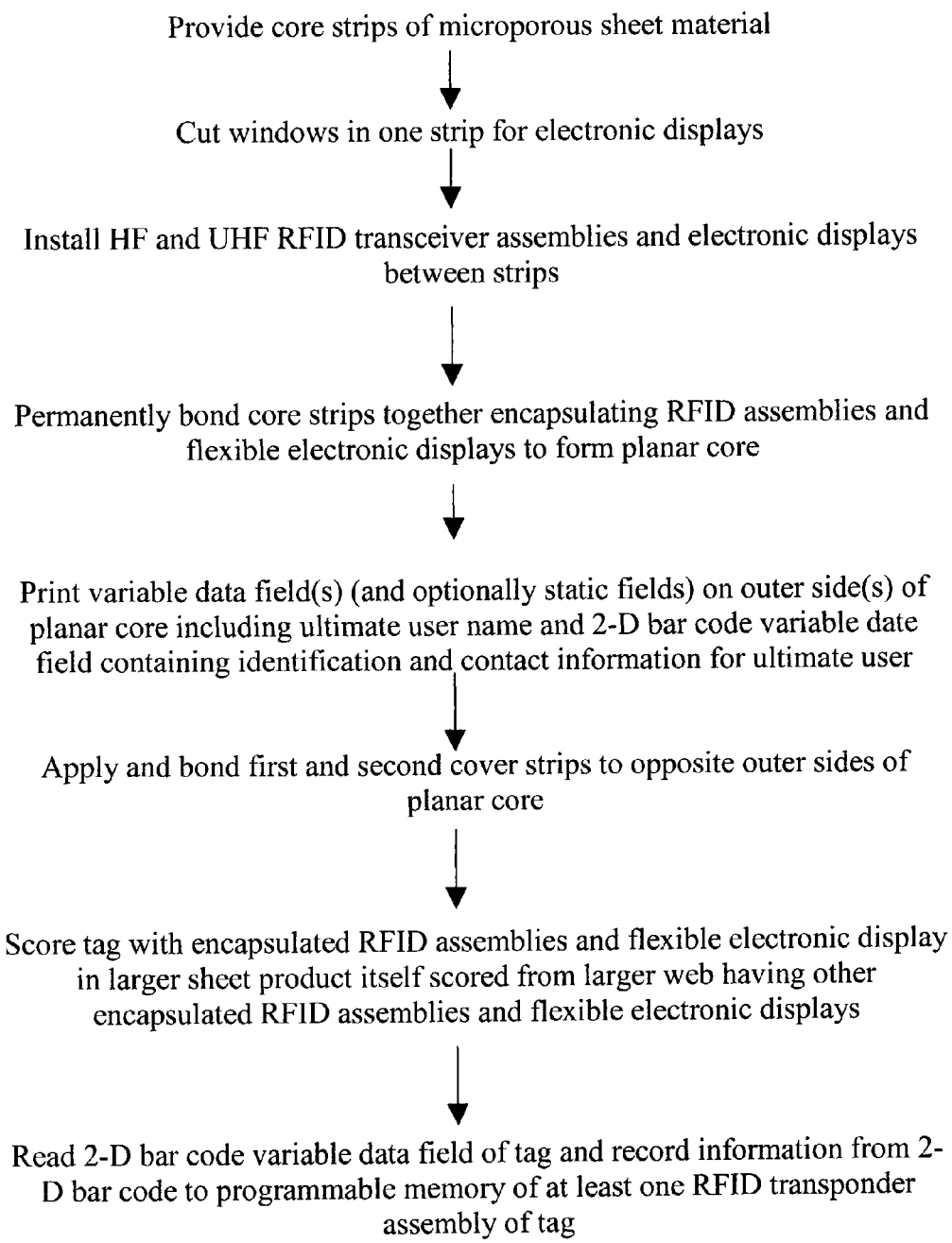
FIG. 11 depicts the steps that might be followed to produce the sheet products of FIGS. 7-10.

FIG. 11 lists a set of suggested steps of fabricating luggage tags 110*a*. First and second core strips 118, 120 are provided. Preferably, a single continuous web of microporous polymer sheet material is scored lengthwise to permit the sheet to be folded over such that halves of the continuous web form the first and second core strips 118, 120 joined together along one edge. Alternatively, separate webs may form the separate core strips 118, 120 or even pairs of cut sheets substituted for the web(s). Windows 108 (see FIG. 9) are scored at regular intervals on one of the core strips (e.g. 118) for alignment with the programmable electronic flexible sheet displays 160. Preferably, a layer 122 of an appropriate adhesive is applied on an "inner" side of at least one of the two strips (e.g. strip 120) and HF and UHF RFID transponder assemblies 127, 137 and programmable electronic flexible sheet displays 160 are laid down in clusters at regularly spaced intervals in the adhesive layer 122 on the one core strip (120). Antennas of the assemblies 127, 137 may be formed or laid down separately from the chips containing the assembly electronics. The halves of the web are folded together or other members forming the core strips 118, 120 otherwise brought together and permanently bonded to form core 112 with encapsulated RFID transponder assemblies 127 137 and programmable electronic flexible sheet displays 160 aligned with the windows 108.

Preferably, the variable data fields 124, 125 (etc.) are preferably laser printed on the either or both of the major planar sides (side 116 of the depicted, preferred embodiment) of the resulting core 112. The static graphic fields 130, etc. may be offset printed before provision of the core strips or may be printed after the core 112 is assembled. Again, the QR or other machine readable, two-dimensional bar or matrix code preferably defines the first variable data field 124 and is printed with encoded information unique to the RFID assemblies 127, 137 and the ultimate designated recipient/user of the tag. That information includes or may include at least one unique identification code and preferably several unique codes including the unique identification code(s) of the inlay(s) 127, 137 assigned by their manufacturer(s). That information further preferably includes or may include other information unique to the ultimate designated recipient/user assigned the tag such as a unique customer code assigned to the customer/ultimate tag user by the carrier or travel scheduler (e.g. travel agent or service) that may have arranged for the preparation of the tag 110a; at least electronic contact information for the individual assigned to the tag, preferably a cell phone number or email address or both, for voice and/or text messaging; and appropriate instructions for communicating to or with the individual according to the provided electronic contact information. That information further preferably includes or may include instructions for geo-tagging the location of the tag.

Preferably, first and second transparent cover strips 140, 150 are then applied to the opposite outer sides 114, 116 of the core 112 protecting the printed information. Preferably, individual printed sheet products 110, 111, etc. larger than and including the tag(s) 110a for one ultimate designated tag recipient/user are cut from the web or sheets of the largest, batch sheet product 100 and the outer edges of the individual luggage tag(s) 110a, any other identification elements like cards 110b and closed perimeter opening(s) 168 scored into the larger sheet products 110, 111, etc., preferably as each larger sheet product 110, 111, etc. is cut from the largest, batch sheet product 100.

The two-dimensional bar or matrix code 124 of each printed sheet product/luggage tag 110/110a is read (i.e. optically imaged) and the contained information, the ultimate designated recipient/user's name, address, unique identification number, cell phone number and/or email address, and the appropriate command string for contacting the individual via text messaging and/or voice, with or without tag location (geo-tagging instructions), are encoded into a programmable memory portion of at least one RFID transponder assembly, suggestedly the HF transponder assembly, to utilize existing cell phone programming technology. While this is conveniently done after the larger sheet product 110 is removed from the even larger continuous web 100 or sheets containing several of the larger sheet products 110, 111, etc., to permit individual handling of the larger sheet products, the programming can be done before the larger sheet products are even scored from the continuous web or largest batch sheets. The larger sheet product 110 can be sized and its elements positioned such that it may be placed in an envelope with the second variable data field 125 containing the name and address of the customer/ultimate user visible in a window of the envelope and mailed directly to the customer/ultimate user assigned the tag 110a.

It will be appreciated that luggage tags with much the same features could be made in other ways. For example, a luggage tag blank including the core 112 with any static graphic fields 130, first and second RFID assemblies 127, 137, flexible, programmable, electronic sheet display 160 and first and second cover strips 140, 150 may be manufactured as blanks, in batches, with or without unique RFID assembly code printed on the core or cover strips. At a subsequent location, the blanks can be personalized by polling either of both RFID assemblies to obtain the unique assembly code number(s) and combined with the other information for the ultimate designated recipient, e.g. separate unique code identifier, unique name/address combination, unique contact information (cell phone number, email address etc.) and instructions for contacting the ultimate designated recipient via the contact and, if desired, for geo-tagging the location of the tag, all into a two dimension bar code image that can be printed on one of the cover strips 140, 150, directly or into a d2t2 material layer, along with any other variable data fields (e.g. 125) containing identification information unique to the ultimate designated recipient (e.g. name and address is normal alpha numeric characters, photo image of recipient, etc). At least a programmable memory portion of at least one of the two RFID assemblies is programmed with information present in or like the information present in the two dimensional bar code image and programmed to transmit instructions to contact the ultimate designated recipient when the assembly is polled. At least one of the RFID assembly(-ies) and the outside of the tag are thus encoded. The tag can be forwarded to the ultimate designated recipient. Another alternative is to manufacture just the cores with RFID assemblies and programmable electronic flexible sheet display 160 and forward them to a distributor, which would print the variable data codes (with or without static graphic field(s)) on the core, laminate the printed core with the first and second cover strips, and program the RFID assemblies with the ultimate recipient unique information.

Generally speaking, one suggested method of using the luggage tag 110 includes creating a travel itinerary in electronic form at a location remote from the luggage tag, transmitting the itinerary electronically to the location of the luggage tag, joining the itinerary information with information from the two dimensional bar code printed on the tag or encoded in the memory of at least one of the RFID assemblies, and transmitting electronically the joined information to a storage location remote from the luggage tag. This might be done, for example, by encoding information from the travel itinerary into a two dimensional bar code image; transmitting the two dimensional bar code image with the travel itinerary information to a user over the internet; capturing the transmitted two dimensional bar coded image and the printed two dimensional bar code with a camera and suitable APP equipped cell phone; and sending the joined information via the cell phone to a location where the joined information can be stored for future retrieval by the user, carrier, travel agent/agency, Transportation Security Administration and others.

More particularly, FIG. 12 depicts the steps of one preferred method of loading travel information onto the luggage tag 110a. An itinerary is created online by or for the luggage tag user in communication with an airline or other organization hosted web site remote from the customer and tag. Typically, the ultimate designated tag recipient would register with the host organization in order to obtain the tags or the tags would be registered by or for the recipient with the organization after they are obtained (depending upon how the tags are distributed) and an account opened with a password. The itinerary may be created as the account is being set up or afterwards. Each unique itinerary would be assigned a unique itinerary identification number by the web site (e.g. AA123456) in the web site database. The ultimate designated tag recipient would then be prompted to check-in bags on-line in order to provide expedited bag check-in at the terminal. A unique two dimensional bar code would be generated by the web site and sent to the customer. The unique two dimensional bar code would contain the unique itinerary information or at least the unique itinerary identification number (e.g. AA123456), as well as instructions for coupling the itinerary with the bag. The customer would be prompted to scan the two dimensional bar code including itinerary information with a suitably configured, camera and APP equipped cell phone. The customer would be then prompted to scan the unique two dimensional bar code 124 of the tag 110*a* on the piece of luggage to be used. Instructions embedded in the two dimensional bar code received from the web site (or in the tag bar code) would be processed by the cell phone APP, which automatically connects the unique itinerary information/number with the unique bag identification information/number and transmits that information via the cellular connection back to the web site or to another designated data storage location remote from the tag. As indicated above, the information embedded in the two dimensional bar code in or constituting the first variable data field 124 of the tag 110*a* includes at least one and preferably multiple unique customer identifiers. The unique customer identifier(s) may be an identification code assigned to the ultimate designated tag recipient or a name and address combination or unique contact information such as cell phone number or internet address of the ultimate designated tag recipient or even the unique number(s) assigned by the manufacturer to the RFID assembly or assemblies. The unique customer and itinerary information is extracted by the cell phone APP from the web site generated bar code and from the imaged tag code (124) and are preferably combined by the APP in the cell phone and then transmitted via the cell phone to the web site or other remote storage location, which connects and/or stores the user identification information from the luggage tag with the unique itinerary information in a database at the web site or other remote storage location. The recipient may also be required to forward an image of the piece of luggage bearing the tag for future identification and/or security purposes. This is repeated as necessary for the number of bags to be used.

At airport arrival, the bag is weighed and the two dimensional bar or matrix code of each tag 110*a* scanned to identify the recipient and from that, the itinerary linked to the customer. If the tag, itinerary and the identification produced at the airport by the recipient all agree with one another, the bag is accepted. If not already entered, itinerary and/or flight information (e.g. flight number, destination airport, etc.) can be entered electronically at the check-in location preferably into the programmable memory portion of the UHF RFID transceiver assembly 137 and the programmable electronic flexible sheet display 160 via radio signals. Once programmed, the UHF transceiver assembly 137 can be remotely interrogated from several meters away as it passes through the baggage handling system and its location identified. The airline would interrogate the UHF transponder assembly whenever the bag passes a critical sorting location, e.g. a terminal conveyor directing baggage to a particular aircraft or receiving baggage from a particular aircraft or being delivered to a carousel or other final baggage claim area. So, for example, the bag information can be captured by interrogating UHF transceiver assembly 137 as the bag with the tag 110*a* is being loaded into the aircraft and the customer sent a communication (tweet, SMS, automatic phone or email message) confirming that the bag has been loaded on an identified aircraft.

An alternative method of use of the luggage tag 110*a* might entail a cell phone equipped with an RFID reader/writer circuit and application (APP) that can be activated and used to interrogate the HF transponder assembly 127 of the tag 110*a* for identification information from the tag (e.g., the unique transponder identification code). If the cell phone is equipped with an appropriate APP, the APP thereafter connects the cell phone with a central data base (e.g the above-identified web site) containing the relevant travel information for the tag user, such as the user's itinerary. If more than one itinerary is being stored, the user is prompted to select the appropriate itinerary. The central data base sends itinerary information, which could be in the form of a Baggage Source Message ("BSM"), back to the cell phone. In response, the APP directs the RFID writer in the phone to write the appropriate itinerary information and the user's contact information (e.g. cell phone number/email address) to the programmable memory of the HF RFID assembly 127. (HF reader/writer circuits and APPs currently exist for cell phones. Once UHF reader/writer circuits and APPs become available for cell phones, the information can be snet directly into the UHF inlay programmable memory.) The programmable memory of the HF RFID assembly 127 may be linked internally within the tag with that of the UHF RFID assembly 137 to pass the information entered into the HF volatile or programmable memory into the UHF volatile or programmable memory. Alternatively, the airline can provide the reading and writing capability to read and transfer information from the HF programmable memory to the UHF programmable memory as part of the baggage intake function. Once in the UHF memory, the stored information can be produced whenever the UHF RFID transponder assembly 137 is properly interrogated. The airline would interrogate the UHF transponder assembly whenever the bag passes a critical sorting location, e.g. a terminal conveyor directing baggage to a particular aircraft or receiving baggage from a particular aircraft or being delivered to a carousel or other final baggage claim area. Each time the tag is polled at one of these locations, a message can be sent to the user informing the user of the bag's location.

As an alternative to a cell phone for obtaining and loading information onto a tag, an RFID reader/writer can be connected to a computer terminal for interaction with the tag RFID assembly programmable memory or memories, for example, when the user contacts the airline to obtain an electronic boarding pass. A BSM and/or other itinerary information and a user contact information (phone number and/or email address) can be transmitted from the hosted web site via the computer terminal to the tag for entry into the RFID programmable memory (-ies). Thus encoded, the tag 110*a* with attached bag can then be dropped off at an express baggage intake location at the airport where the tag is interrogated automatically or manually by airline personnel to read the programmable memory for the BSM and the user's contact information and a message (text or automatic voice) confirming intake of the bag and any other information such as weight information or baggage charges sent to the user automatically. Alternatively, the two-dimensional data field 124 or the non-programmable memory of one of the RFID assemblies 127, 137 can be polled when the user is checking-in for a departure and the relevant BSM or other itinerary information and the user contact information written into the programmable memory (-ies) of the tag 110*a* at that time.

Figure 13:
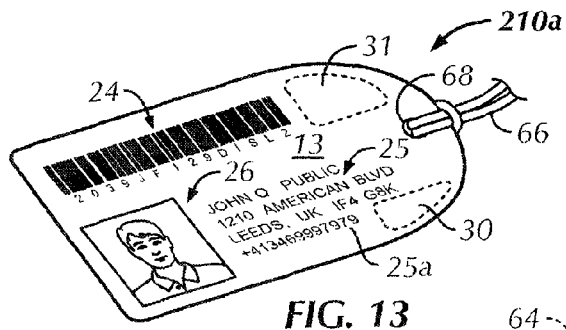
FIGS. 13 and 14 are views of first and second opposing major planar sides, respectively, of a third exemplary embodiment printed planar baggage tag according to the present invention.
Figure 14:
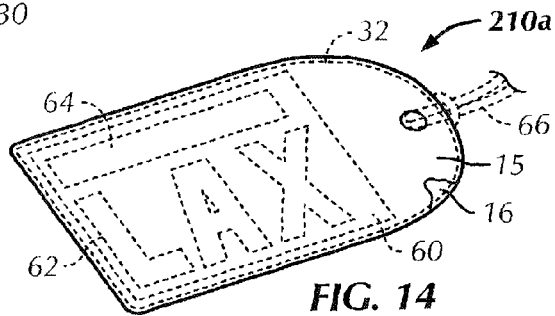
Figure 15:
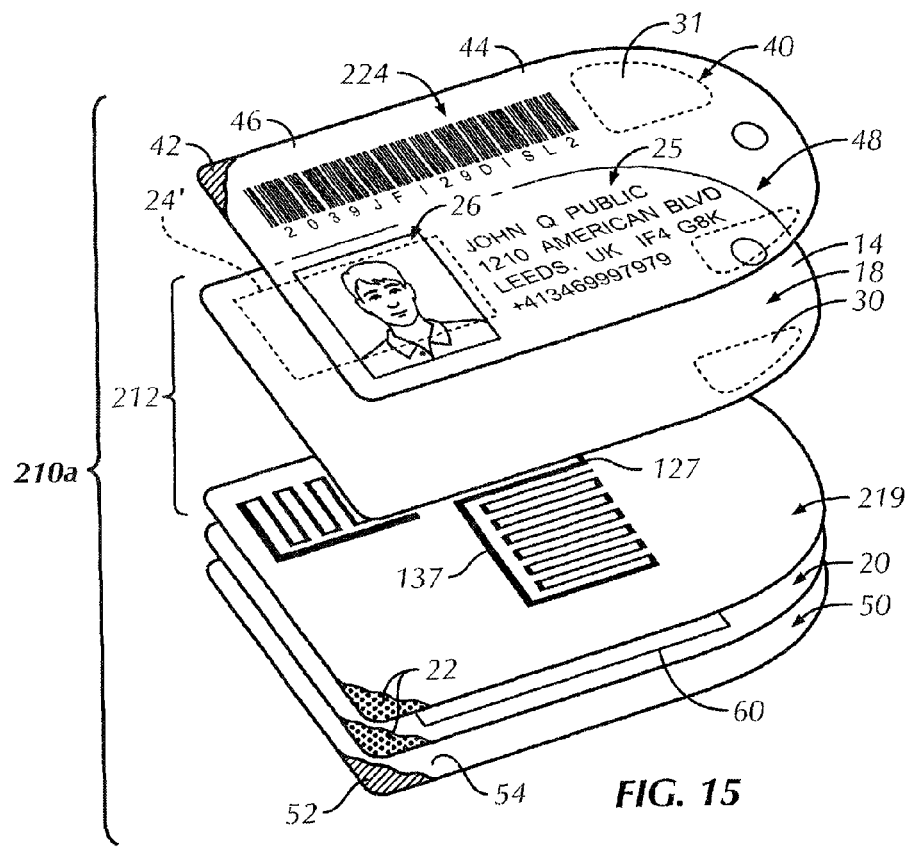
FIG. 15 is an exploded view of the printed planar baggage tag of FIGS. 13 and 14.

FIGS. 13-15 depict a third embodiment tag 210*a* that might be preferred for transitional use between the first embodiment 10*a* and second embodiment 110*a* tags. The element/tag 210*a* incorporates features of both. It again includes a planar, flexible sheet core indicated generally at 212 having outer major planar opposing first and second sides 14 and 16, the first/"front" side 14 being depicted in FIGS. 13 and 15 and the second/"rear" side 16 being depicted in FIG. 14. Core 212 is preferably formed by at least first and second core strips 18, 20 fixedly and permanently joined together around at least one and preferably a pair of radio frequency identification (RFID) transponder assemblies, HF and UHF indicated generally at 127 and 137 in FIG. 15, Each of the first and second core strips 18, 20 is again an integral, planar, flexible microporous polymer material strip that can at least partially collapsed around each assembly 127, 137. The first/front side 14 of core 212 is formed by an exposed major side of the first core strip 18. The second/rear side 16 of core 212 is formed by an exposed major side of the second core strip 20. Again, anti-counterfeiting tag agent ("taggent") can be provided to either or both core strips 18, 20, if desired. Again, a first cover strip indicated generally at 40 is integrally and permanently secured to the core 212 over the exposed major side 14 of the first core strip 18 forming the first major planar outer side 213 of the tag 210a that is coextensive with the core 212. Preferably, second cover strip 50 is provided integrally secured to the second core strip 20 forming the second/rear major planar side 16 of the core 212 coextensive with the core 212 and forming the second outer side 15 of the tag 210a.

The data depicted on this third tag 210a differs from that on the second tag 110a in several respects. Most significantly, the two dimensional (2-D) bar or matrix code in or constituting the first variable data field 124 is replaced again by the original printed one dimensional bar code 24 and the conventional airport 62 and individual luggage identification code 64 displayed in the enlarged, programmable electronic flexible sheet display 60 of electronic paper or "E-paper", provided on the second/rear sides 15, 16 of the tag 210a and core 212. In the depicted embodiment, the programmable electronic flexible sheet display 60 including its supporting circuitry is integrally secured within the core 212 between the first and second core strips 18, 20, separated from the RFID assemblies 127, 137 by a third, intermediate core strip 219, again preferably a microporous polymer material to better protect the assemblies 127, 137. The programmable electronic flexible sheet display 60 is externally "programmed" by radio frequency signals to exhibit conventional luggage tag coded information, in this case at least a conventional, one-dimensional picket fence bar code 64 of the type used on the bag identification tags currently applied by airlines to checked bags as well as the destination airport abbreviation 62 and possibly flight identification information (not depicted). The proportions of the displayed data fields 62, 64 and any other (s) can be varied as desired or necessitated by the equipment with which the tag 210a is used. Tag 210a can replace the conventional airline applied baggage identification tag and can be used with the existing airline/airport infrastructure utilizing conventional, one-dimensional, picket fence type bar codes like code 24. The display 60 can later or alternatively be programmed to display a 2-D code like code 124 where and when the infrastructure for that type of coding is or becomes available.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. An integral, one-piece, resiliently flexible, planar, reusable, programmable radio frequency identification (RFID) luggage tag comprising:

a planar flexible sheet core having major planar opposing first and second sides, the core including at least first and second core strips of flexible, microporous polymer material fixedly and permanently joined together, the microporosity being provided by pores located substantially throughout the microporous polymer material;

a first non-porous, polymer film cover strip integrally and permanently secured to the first major outer side of the core, the first cover strip being coextensive with and forming a first outer side of the tag;

a first RFID transponder assembly operating at a first frequency and a second RFID transponder assembly operating at a second frequency different from the first frequency permanently and integrally embedded between the first and second first core strips, partially collapsing the porosity of the core strip material enough to maintain an essentially uniform thickness with the transponder assembly embedded, at least one of the first and second transponder assemblies including non-volatile memory containing a non-alterable permanent code uniquely assigned to the transponder assembly and at least one of the first and second transponder assemblies containing a programmable memory portion with space to store information externally programmed into the portion; and a programmable electronic flexible sheet display in a visibly accessible position on the tag.

2. The luggage tag of claim 1 wherein at least the one of the first and second transponder assemblies is configured to transmit at least a unique portion of the non-alterable permanent code upon interrogation.

3. The luggage tag of claim 1 wherein at least one of the first and second transponder assemblies is configured to transmit at least a portion of the externally programmed information upon interrogation.

4. The luggage tag of claim 1 further comprising information uniquely identifying an ultimate designated recipient permanently printed in a first variable data field of the tag.

5. The luggage tag of claim 4 wherein the information uniquely identifying an ultimate designated recipient assigned the tag is encoded on the tag in a machine readable, two dimensional bar code format in the first variable data field of the tag.

6. The luggage tag of claim 4 wherein the permanently printed information uniquely identifying an ultimate designated recipient comprises at least one of a phone number and email address of the ultimate designated recipient of the tag printed in a machine readable format in the first variable data field of the tag.

7. The luggage tag of claim 6 wherein the at least one of a phone number and email address of the ultimate designated recipient of the tag is further encoded in the programmable memory portion of at least one of the first and second RFID transponder assemblies to be transmitted by the at least one of the first and second RFID transponder assemblies upon interrogation.

8. The luggage tag of claim 6 further comprising instructions to contact the ultimate designated user of the tag via the at least one of a phone number and email address permanently printed together with the at least one of a phone number and email address in the first variable data field in the machine readable, two dimensional bar code format.

9. The luggage tag of claim 8 wherein the at least one of a phone number and email address and the instructions to contact the ultimate designated user of the tag via the at least one of a phone number and email address are encoded in the programmable memory portion of at least one of the first and second RFID transponder assemblies to be transmitted by the at least one of the first and second RFID transponder assemblies upon interrogation.

10. The luggage tag of claim 1 wherein at least one of a phone number and email address of the ultimate designated recipient of the tag is encoded in the programmable memory portion of at least one of the first and second RFID transponder assemblies to be transmitted by the at least one of the first and second RFID transponder assemblies upon interrogation.

11. The luggage tag of claim 4 wherein the permanently printed information uniquely identifying an ultimate designated recipient comprises a visual image of the ultimate designated recipient.

12. The luggage tag of claim 11 wherein the visual image of the ultimate designated recipient is a dye diffusion thermal transfer layer on the first non-porous, polymer film cover strip.

13. The luggage tag of claim 1 wherein at least one of a phone number and email address is encoded with instructions to contact the ultimate designated user of the tag via the at least one of a phone number and email address in the programmable memory portion of at least one of the first and second RFID transponder assemblies to be transmitted by the at least one of the first and second RFID transponder assemblies upon interrogation.

14. The luggage tag of claim 1 further comprising a second, non-porous, polymer film cover strip integrally and permanently secured to the second major outer side of the core, the second cover strip being coextensive with and forming a second outer side of the tag and a closed perimeter opening located entirely within and extending entirely transversely through the tag including the and first and second cover strips while avoiding the first and second RFID assemblies and a programmable electronic flexible sheet display.

15. The luggage tag of claim 1 being coextensive in area with area of the core and having maximum dimensions of a standard size selected from CR-80, CR-90 and CR-100 standards.

16. The luggage tag of claim 1 further comprising at least one unique code permanently printed on at least one of the first and second major sides of the tag, the at least one unique code being unique to the tag and to at least one of the first and second RFID assemblies.

17. The luggage tag of claim 16 wherein the at least one unique code at least includes a unique portion of the non-alterable permanent code.

18. A method of using the luggage tag of claim 1 comprising the step of programming into a programmable memory portion of at least one of the first and second RFID assemblies, information related to a first travel itinerary of the luggage tag.

19. The method of claim 18 further comprising the step of subsequently programming into the programmable memory portion overwriting the information related to the first travel itinerary, information related to a second, different travel itinerary of the individual.

20. The method of claim 18 further comprising the step of programming into the programmable electronic flexible sheet display to be visibly displayed, at least one of a destination airport abbreviation code and a baggage claim identification number.

21. A method of using the luggage tag of claim 1 comprising the steps of:
interrogating at least one of the first and second RFID transponder assemblies of the luggage tag with a radio frequency signal; and
storing information provided by the at least one RFID transponder assembly in response to the interrogating radio frequency signal in a carrier baggage management system.

22. A method of using the luggage tag of claim 1 comprising the steps of:
creating a travel itinerary in electronic form at a remote source;
transmitting the itinerary to the ultimate designated recipient of the tag from the remote source;
joining the itinerary information with information from the two dimensional bar code printed on the tag;
transmitting the joined information back to the remote source.

23. The method of claim 22 wherein:
the creating step comprises encoding information from the travel itinerary into a two dimensional bar code image;
the first transmitting step comprises transmitting the two dimensional bar code image to a user;
the joining step comprising capturing the transmitted two dimensional bar coded image and the printed two dimensional bar code with a camera equipped cell phone; and
the second transmitting step comprises sending the joined information via the cell phone.

24. An integral, one-piece, resiliently flexible, planar, reusable, programmable radio frequency identification (RFID) luggage tag comprising:
a planar flexible sheet core having major planar opposing first and second sides, the core including at least first and second core strips of flexible, microporous polymer material fixedly and permanently joined together, the microporosity being provided by pores located substantially throughout the microporous polymer material;
a first non-porous, polymer film cover strip integrally and permanently secured to the first major outer side of the core, the first cover strip being coextensive with and forming a first outer side of the tag;
a first RFID transponder assembly operating at a first frequency and a second RFID transponder assembly operating at a second frequency different from the first frequency permanently and integrally embedded between the first and second first core strips, partially collapsing the porosity of the core strip material enough to maintain an essentially uniform thickness with the transponder assembly embedded, at least one of the first and second transponder assemblies including non-volatile memory containing a non-alterable permanent code uniquely assigned to the transponder assembly and at least one of the first and second transponder assemblies containing a programmable memory portion with space to store information externally programmed into the portion; and
at least one of a phone number and email address of an ultimate designated recipient permanently printed in a first variable data field of the tag in a machine readable, two dimensional bar code format.

25. The luggage tag of claim 22 further comprising instructions to contact the ultimate designated user of the tag via the at least one of a phone number and email address printed in the machine readable, two dimensional bar code format on the tag with the at least one of a phone number and email address in the first variable data field.

26. An integral, one-piece, resiliently flexible, planar, reusable, programmable radio frequency identification (RFID) luggage tag comprising:

a planar flexible sheet core having major planar opposing first and second sides, the core including at least first and second core strips of flexible, microporous polymer material fixedly and permanently joined together, the microporosity being provided by pores located substantially throughout the microporous polymer material;

a first non-porous, polymer film cover strip integrally and permanently secured to the first major outer side of the core, the first cover strip being coextensive with and forming a first outer side of the tag;

a first RFID transponder assembly operating at a first frequency and a second RFID transponder assembly operating at a second frequency different from the first frequency permanently and integrally embedded between the first and second first core strips, partially collapsing the porosity of the core strip material enough to maintain an essentially uniform thickness with the transponder assembly embedded, at least one of the first and second transponder assemblies including non-volatile memory containing a non-alterable permanent code uniquely assigned to the transponder assembly and at least one of the first and second transponder assemblies containing a programmable memory portion with space to store information externally programmed into the portion; and at least one of a phone number and email address of an ultimate designated recipient encoded into the programmable memory portion of the at least one of the first and second transponder assemblies so as to be transmitted by at least one of the first and second transponder assemblies upon interrogation.

27. The luggage tag of claim 26 further comprising instructions to contact the ultimate designated user of the tag via the at least one of a phone number and email address encoded into the programmable memory portion of the at least one of the first and second transponder assemblies so as to be transmitted by at least one of the first and second transponder assemblies upon interrogation.

\* \* \* \* \*